No. 643,679. Patented Feb. 20, 1900.
J. A. PHILLIPS.
GARMENT FASTENER.
(Application filed Sept. 12, 1899.)

(No Model.)

Witnesses
B. F. Boyden
Henry C. Wagner

Inventor
Joseph A. Phillips
By Boyden & Co.
Attorneys

UNITED STATES PATENT OFFICE.

JOSEPH A. PHILLIPS, OF BALTIMORE, MARYLAND, ASSIGNOR TO THE RAYMOND BUTTON COMPANY OF BALTIMORE CITY, OF MARYLAND.

GARMENT-FASTENER.

SPECIFICATION forming part of Letters Patent No. 643,679, dated February 20, 1900.

Application filed September 12, 1899. Serial No. 730,227. (No model.)

*To all whom it may concern:*

Be it known that I, JOSEPH A. PHILLIPS, a citizen of the United States, residing at Baltimore, in the State of Maryland, have invented certain new and useful Improvements in Garment-Fasteners, of which the following is a specification.

This invention relates to an improved garment-fastener of that class which consists of a socket member and a stud member.

The object of the invention is to provide a simple, cheap, and efficient device for use on dress-plackets or wherever it is desired that the fastener should be invisible.

Other features of the invention will be fully set forth in the following description of the accompanying drawings, in which—

Figure 1:
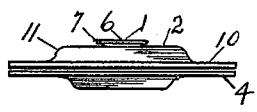
Figure 2:
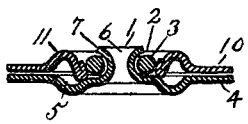
Figure 3:
Figure 4:
Figure 5:
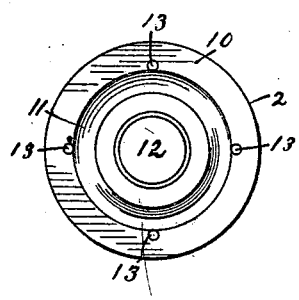
Figure 6:
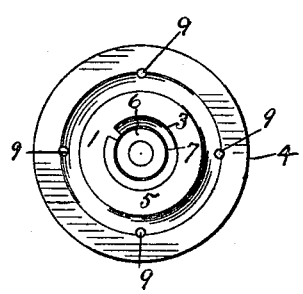

Figure 1 is an elevation of the complete fastener. Fig. 2 is a vertical section of same. Fig. 3 is an edge view of the socket member. Fig. 4 is an edge view of the stud member. Fig. 5 is a plan view of the socket member, and Fig. 6 is a plan view of the stud member.

Similar reference-numerals refer to like parts throughout the several views.

In the accompanying drawings, 1 represents the stud member, 2 the socket member, and 3 the split ring.

The stud member 1 is stamped up from a single piece of metal and consists of a flange 4, having an annular groove 5, a hollow shank 6, having its upper end open, and the metal at the said open end being curved outwardly to form the flange 7. The shank 6 is provided on the outside with a split ring 3, the purpose of which will be presently pointed out. When the stud member is first formed, the wall of the hollow shank is stamped up in a vertical position, the ring 3 is then placed over the said shank 6, and the flange 7 formed by any suitable tool, thereby holding the said ring in position around the shank 6. Holes 9 are provided, through which stitches may be passed to hold the said stud on the garment. The socket member 2 is also stamped up from a single piece of metal and consists of the flange 10, having an annular groove 11 and a central aperture 12 of a diameter slightly less than that of the split ring 3, the edge of the metal around the aperture 12 being turned upward to reinforce the said edge and prevent it from bending out of shape from the constant contacting of the said edge with the split ring in connecting or disconnecting the parts. The socket member 2 also has holes 13 to permit it being secured to the garment by means of stitching or otherwise. The two parts—the socket member and the stud member—are placed on opposite sides of the opening of the garment, and when it is desired to fasten the opening the parts are brought together, the shank 6 of the stud will enter the aperture 12, and as the parts are forced tightly together the split ring will contract and allow the socket 2 to slip over. The ring 3 will then spring back to its normal position and hold the parts securely together.

It will be seen that by forming the parts with the annular grooves 5 and 11 greater strength will be given to the parts and prevent them from bending or twisting out of shape by reason of the strain brought to bear thereon when the parts are connected or disconnected.

Having thus described my invention, what I claim is—

1. In a garment-fastener, the combination of the stud, 1, consisting of a hollow shank, 6, having its upper end open and bent laterally to form the flange, 7, a flange, 4, having an annular groove, 5, all of said parts formed of one piece of metal; split ring, 3, around the outside of the shank, 6; and a socket, 2, having an annular groove, 11, a central aperture, 12, of less diameter than the split ring, 3; the metal around the said aperture being bent upward to reinforce the edge.

2. In a garment-fastener, the combination of the stud, 1, consisting of the hollow shank, 6, having a flange, 7, at the upper end, and a flange, 4, having an annular groove, 5; a split ring, 3, on the said shank, 6; and a socket, 2, having an annular groove, 11, and a central aperture, 12, the metal around the said aperture being turned upward to reinforce the edge.

In testimony whereof I affix my signature in the presence of two witnesses.

JOSEPH A. PHILLIPS.

Witnesses:
CHAPIN A. FERGUSON,
B. F. BOYDEN.